Oct. 30, 1928.

R. MONNOT

GREASE GUN FILLING DEVICE

Filed June 9, 1927

1,689,360

INVENTOR
Robert Monnot
BY
Emil Bonnelycke
ATTORNEY

Patented Oct. 30, 1928.

1,689,360

UNITED STATES PATENT OFFICE.

ROBERT MONNOT, OF CLICHY, FRANCE.

GREASE-GUN-FILLING DEVICE.

Application filed June 9, 1927, Serial No. 197,696, and in France July 20, 1926.

The object of this invention is to provide a device adapted to permit grease guns of any diameter to be filled by drawing grease or thick oil thereinto from containers, the grease or oil being caused to penetrate into the barrel automatically by simply pressing the device downward upon the surface thereof.

An embodiment of the invention is illustrated in the accompanying drawings, wherein.

Figure 1:
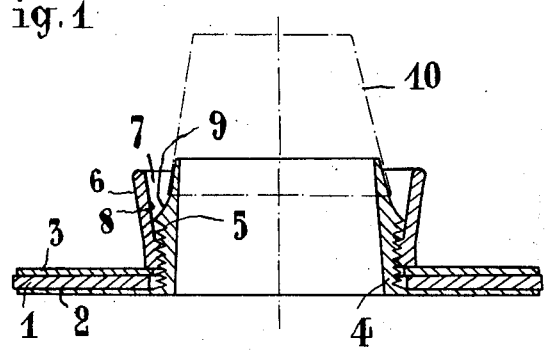
Figure 1 is a vertical section of the barrel-filling device.

The improved device includes a piston formed of a leather, rubber or such-like disk 1 held between disks 2 and 3 made, say, of metal. Disk 2 has a hole formed through its center and carries, soldered to the edge of such hole, a tapered annular member or ring 4, the lower part of which is externally threaded, as indicated at 5. A second tapered ring or member 6 is threaded on the part 5 of ring 4 and presses disk 3 against the packing disk 1. Rings 4 and 6 are of opposite taper, or inverted relatively to one another, so as to offer at their upper parts a V-shaped clearance 7, thus presenting two oppositely-inclined annular surfaces 8 and 9. Still another tapered member or ring 10 may be fitted on ring 4, as represented in dotted lines in Fig. 1; but this third ring is optional.

Inspection of Fig. 1 will render it obvious that on the various inclined annular or conical surfaces offered by the various members of the device, barrels of different diameters can be positioned, so as to permit utilization of guns of different types. On the other hand, disk 1 may be replaced by other disks having exactly the same diameter as the grease or oil container available.

Figure 2:
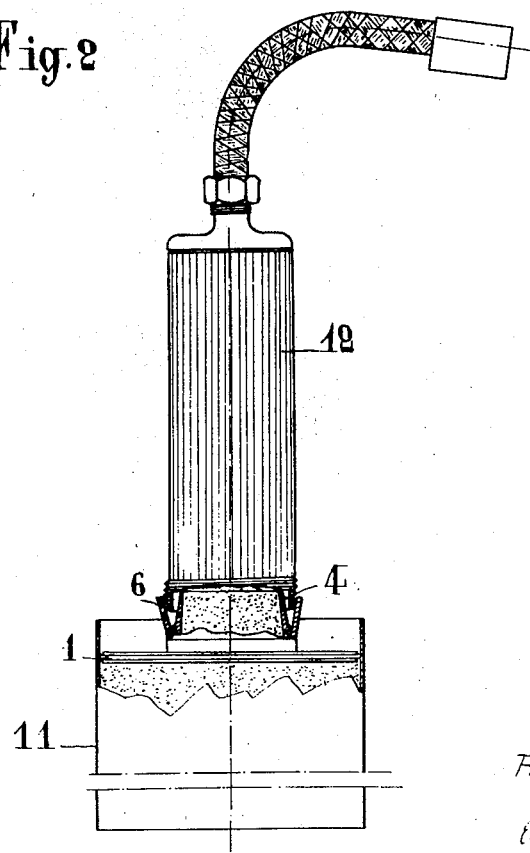
Fig. 2 is a side elevation, partly in section, of a barrel mounted on the device shown in Fig. 1, as during the filling operation.

The above described device is used as follows:

The piston or follower is placed on the surface of the grease or thick oil in an opened container 11, as shown by Fig. 2, disk 1 being supposed to have the same diameter as the container. It is then merely necessary to invert the gun barrel 12 and position it on the conical surface 8 or 9 according to the diameter of the barrel (the gun piston and union having first been removed).

A simple downward pressure exerted on the piston by means of the barrel will compress the grease or oil inside container 11, forcing it to pass upward into and through the conical ring 4. Obviously, continued pressure on the piston will cause the grease to pass from said ring into the barrel which will soon become filled. Nothing further need then be done except to screw the cap on the barrel after having suitably positioned the piston therein.

Having thus described my invention, I claim:

1. A grease gun filling device, comprising a piston adapted to rest upon the surface of the grease in an opened grease container and having a central opening of relatively-large size formed through it; an upstanding inner metal ring fitted at its lower end in said opening and rigidly secured to the edge thereof; and an outer ring encircling and rigidly secured to the inner ring, the two rings having their mutually-adjacent inner surfaces inclined away from each other in opposite directions so as to provide between them an annular space of V-section to receive therein the mouth of the inverted barrel of a gun, whereby the grease in the container will be forced to pass upward through said opening and inner ring into the interior of the barrel to fill the same when the piston is pressed downward upon the grease.

2. A grease gun filling device, according to claim 1, in which the piston consists of a removable intermediate flexible non-metallic disk with metal disks arranged against its opposite faces, the inner ring being rigidly secured to the lower metal disk; and in which the outer ring rests at its lower edge upon the upper metal disk and is adjustably engaged with said inner ring so as to press said upper disk against the non-metallic disk.

In testimony whereof I affix my signature.

ROBERT MONNOT.